H. A. MYERS.
MECHANISM FOR SHIFTING GEARS.
APPLICATION FILED SEPT. 5, 1913.
1,114,631.
Patented Oct. 20, 1914.
3 SHEETS—SHEET 3.
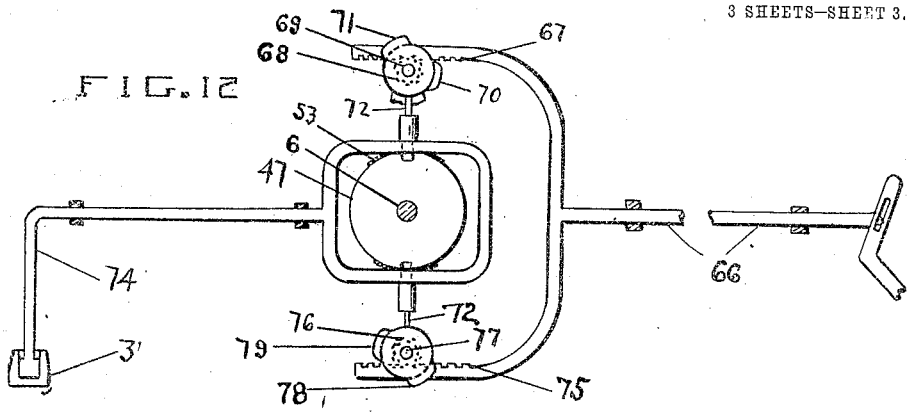
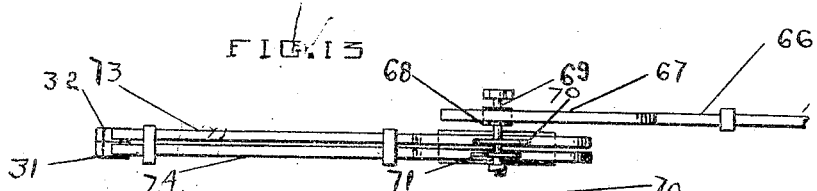
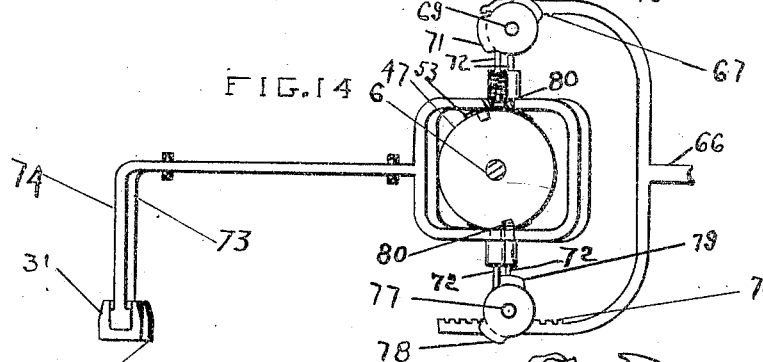
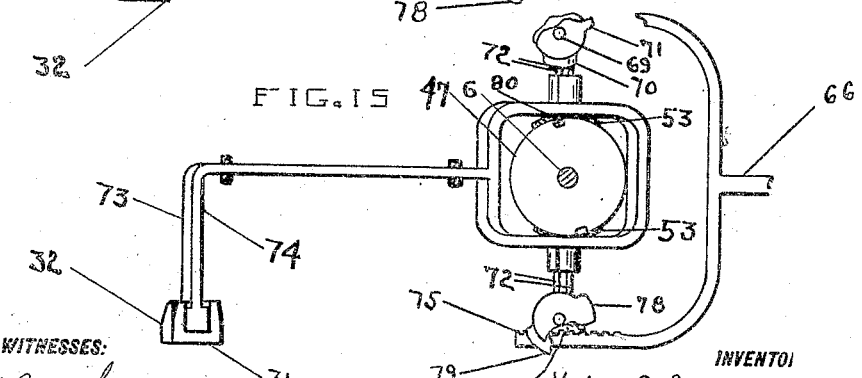
WITNESSES:
INVENTOR
Hubert A. Myers,
BY
Geo E Kirk
ATTORNEY

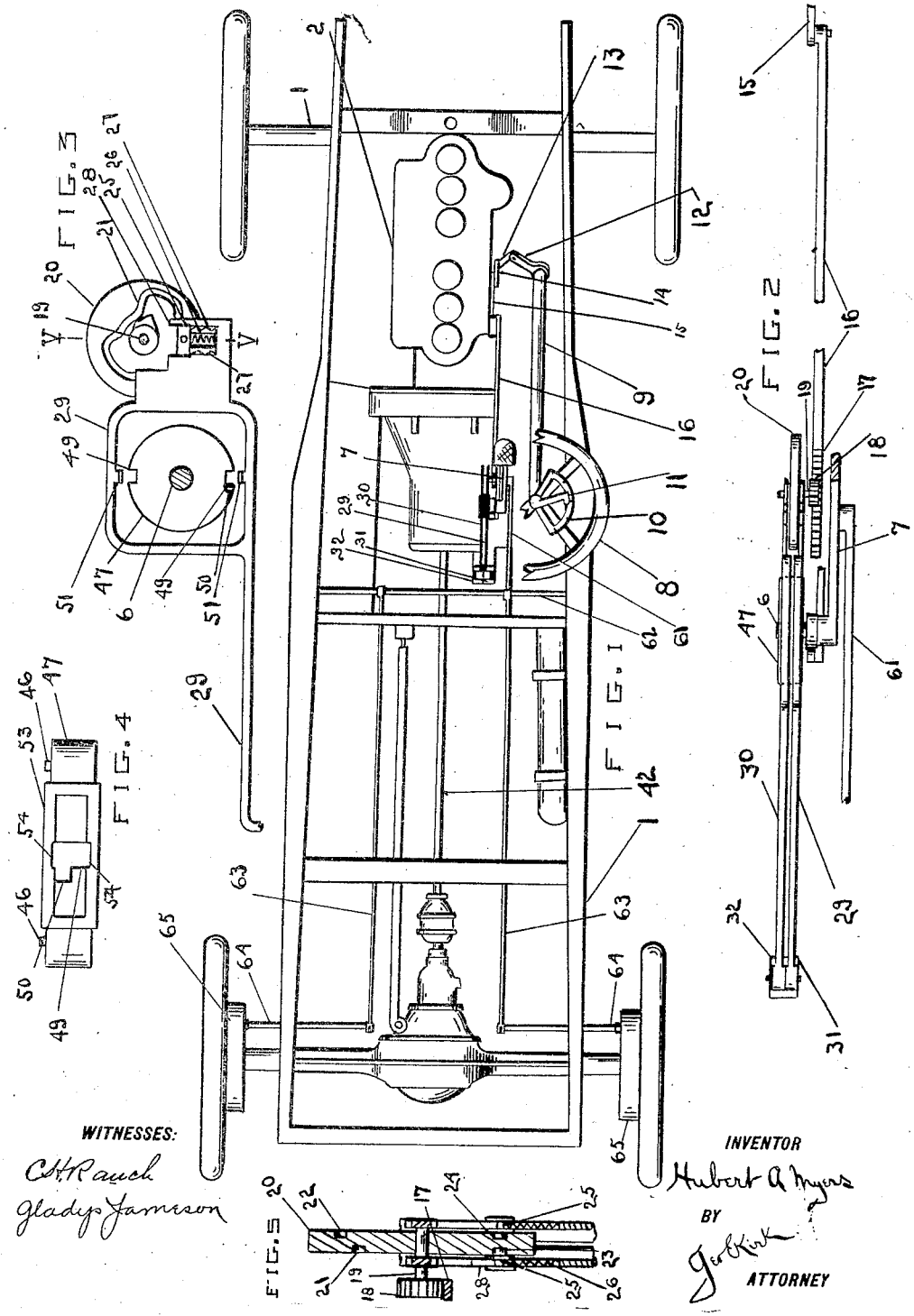

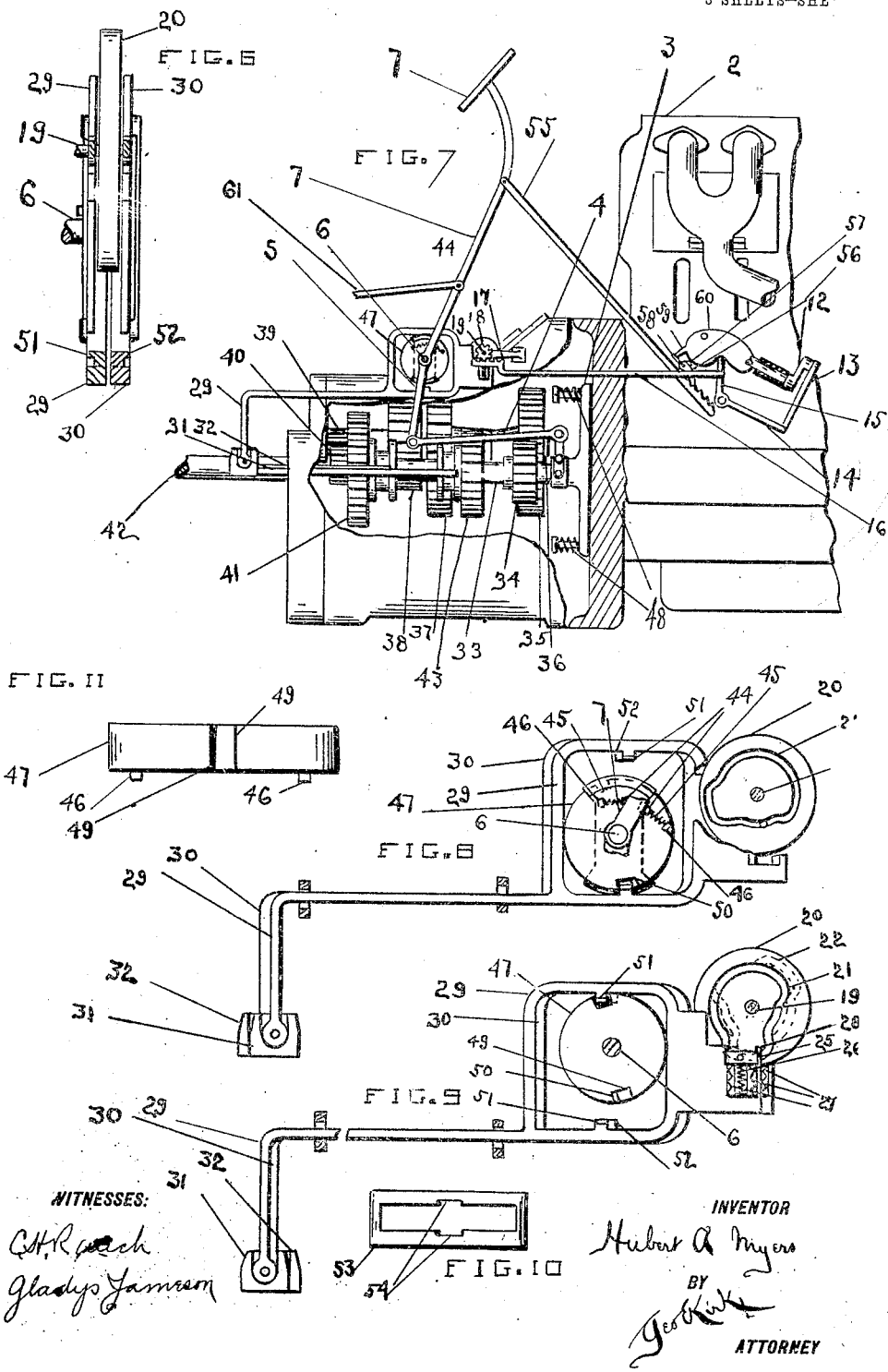

UNITED STATES PATENT OFFICE.

HUBERT A. MYERS, OF TOLEDO, OHIO, ASSIGNOR OF ONE-HALF TO ALBERT A. ATWOOD, OF TOLEDO, OHIO.

MECHANISM FOR SHIFTING GEARS.

1,114,631.  Specification of Letters Patent.  Patented Oct. 20, 1914.

Application filed September 5, 1913. Serial No. 788,338.

*To all whom it may concern:*

Be it known that I, HUBERT A. MYERS, a citizen of the United States, residing at Toledo, Lucas county, Ohio, have invented new and useful Mechanism for Shifting Gears, of which the following is a specification.

This invention relates to features of mechanical control and the mechanism to be controlled thereby, especially of power driven machines.

This invention has utility when incorporated in connection with the driving mechanism of motor vehicles.

Referring to the drawings: Figure 1 is a fragmentary plan view of a motor vehicle of the unit power plant type having an embodiment of the invention adapted thereto for speed and direction of drive control; Fig. 2 is a plan view, on a larger scale, of the mechanical control shown in Fig. 1; Fig. 3 is a side elevation with parts broken away, of the mechanism of Fig. 2, the parts being in neutral position; Fig. 4 is a bottom plan view of the shift bar actuating disk with its retaining shield; Fig. 5 is a section on the line V—V, Fig. 3; Fig. 6 is an end elevation of the control mechanism, looking from the right, Fig. 3, the lower yoke portions and teeth being in section; Fig. 7 is a side elevation of the mechanism as adapted to the unit power plant of Fig. 1; Fig. 8 is a side elevation of the mechanism showing the shift to high speed forward; Fig. 9 is a view similar to Fig. 8, but with the shift to intermediate or second speed forward; Fig. 10 is a plan view of the actuating disk retaining shield; Fig. 11 is a plan view of the actuating disk member; Fig. 12 is a side elevation of the control mechanism in neutral position, with two selecting cam shafts for determining the shifts; Fig. 13 is a plan view of the mechanism of Fig. 12; Fig. 14 shows the mechanism of Fig. 12 shifted to slow speed ahead or forward; and Fig. 15 shows the mechanism of Fig. 12 shifted to reverse or backing position.

The motor vehicle 1 is actuated by the internal combustion motor 2 having the clutch 3. Extending to control the throws of the clutch 3 in and out of driving relation is the link 4 attached to arm 5 extending from the fulcrum 6 of the foot lever 7.

The motor vehicle is guided from the steering wheel 8 mounted on the steering post 9. The steering wheel 8 carries the indicator quadrant 10. To the different positions thereon the selector arm 11 may be shifted to rock the arm 12 connected by the link 13 extending to the angle lever having the arms 14, 15. Pivoted to the arm 15 is the link 16 having the rack 17 in mesh with the pinion 18 on the selecting cam shaft 19, which carries the selecting cam 20 having the grooves 21, 22, therein to be engaged by the rollers 23, 24, carried by the reciprocable blocks 25. These blocks 25 are forced upward by the compression spring 26, and held downward by the tension springs 27 to determine the mean or intermediate neutral position of the block 25 in the guide 28 of the actuating or shifting members 29, 30, which are shown of yoke form. These members 29, 30 are respectively connected to the shift bars proper 31, 32, extending into the unit power plant housing to effect or establish a plurality of driving relations.

The clutch 3, when connected to the motor 2 drives the shaft 33, having thereon the pinion 34 in mesh with the gear 35 on the counter shaft 36, carrying the gears 37, 38 respectively for intermediate and slow speeds forward, and the pinion 39 in mesh with the intermedate pinion 40 for reverse travel when the shift bar 32 throws the gear 41 on the shaft 42 in mesh therewith. With this gear 41 thrown forward it engages the gear 38 for slow speed forward. The shift bar 31 may throw the gear 43 into mesh with the gear 37 on rearward shifting to effect intermediate or second speed travel forward, while opposite shorter travel shifting of this bar 31 toward the front of the vehicle will directly connect the shaft 42 to the shaft 33 for high speed driving ahead.

The clutch lever 7 carries the lug or abutment 44 on each side of which is disposed a compression spring 45 coacting with lugs 46 on the actuating disk 47 loosely mounted on the clutch lever fulcrum shaft 6. There is accordingly provided a yieldable connection between the clutch lever 7 and the actuating disk 47, thus permitting the clutch lever to act in its direct connection to the clutch 3 to overcome the action of the springs 48 for disconnecting the shaft 33 from driving action before the actuating disk 47 is operative. The disk 47 has tooth recesses 49, 50 of different pitches, in its bottom portion to be engaged by the teeth 51, 52, respectively of the yoke members 29, 30. Accordingly when the cam groove 21 is shifted to cause the yoke member 29 to engage the recess 49 with its tooth 51, the throwing of the clutch pedal 7 will first rock the oscillating actuating disk 47 to neutral or disconnected position, and then on the recover of the clutch lever 7 as forced by the clutch springs 48, the disk 47 through its tooth recess 50 engaging the tooth 51 on the lower side of the yoke 29 will cause the yoke 29 to move toward the front of the vehicle and shift the bar 31 into high speed position. The recess 50 being larger than the tooth 51, permits some movement of the disk 47 before shifting begins, thus making the shift travel shorter at recess 50, than at the narrower recess 49 which shifts the bar 30 into slow speed ahead driving position.

The yieldable mounting of the blocks 25 permits selection of speed change desired independently of the action of the lever in effecting the change. Accordingly in this prior selecting, the block 25 which is to effect selection is placed under spring action, so that in the rocking of the clutch lever 7 forward which brings the disk 47 to neutral position, with the groove 21 of the cam in position to effect setting for a new speed relation, the groove 22 is at neutral position to insure withdrawal of the yoke 30. Withdrawal and engagement may only occur at neutral position as controlled by the fixed shield 53 which has notches 54 at the neutral position allowing the teeth 51, 52, having enlarged or club ends, to engage the disk at the notches 54, while the overhanging flanges on each side of these notches 54 serve to retain these teeth in position to be actuated by the disk 47 when away from neutral position.

Connected to the pedal lever 7 is the ratchet bar 55 engaged by the ratchet 56 held in engagement therewith by the spring 57. Rigid with the ratchet 56 is the extension 58 engaged by the arm 59 of the cam 60. This cam 60 is of such contour to be engaged by the arm 15, that at selected neutral position only will the extension 58 allow the ratchet 56 to hold the bar 55. This means when neutral position is selected, a thrusting of the foot lever 7 forward may result in said lever 7 being held forward by the ratchet against the resistance of the clutch springs 48. Accordingly by connecting the link 61 to the clutch lever 7, the rock shaft 62 may be oscillated to actuate the links 63, and through them the rock shafts 64 to act as an emergency stop for the machine by tightening the brakes 65. A resetting of the selector to some position other than neutral will permit release of this emergency brake locking device.

The selection and actuation devices in some instances may conveniently assume the form of Fig. 12, wherein the rack bar 66, corresponding to the selecting rack bar 16, is forked to actuate a plurality of cams, as the range of driving relations may demand. The upper rack 67, on one fork of the bar 66, is in mesh with the pinion 68 on the shaft 69 carrying the cam having the reverse selecting portion 70 and intermediate or second speed selecting portion 71. These cam portions may coact to throw plungers 72 carried by the yokes 73, 74, respectively, into engagement with the actuating disk 47 on the shaft 6, to effect throwing rearwardly the shift bars 32 and 31.

For opposite shifting, the lower fork of the bar 66 carries the rack 75 in mesh with the pinion 76 on the shaft 77 carrying the cam having the high speed selecting portion 78 and the slow speed selecting portion 79. As shown in Fig. 12 these cams are inactive, the selected position being neutral, as is also the showing in Fig. 7. These cam portions 78, 79 engage the yieldable plungers 80 of the yokes 74, 73, respectively. The portion 78 effects selection for shifting to high speed of the yoke member 74 by throwing it forward, while the portion 79 makes engagement for the member 73, for throwing forward by the recover of the clutch lever 7 for slow speed ahead (Fig. 14).

There is in the disclosure herein a mechanism simple and certain for convenient operation, especially in connection with motor vehicles. The actuating connections as determined by the selector may only engage and be disengaged at the neutral position. The releasing thrust forward of the clutch lever 7, always first brings the parts to neutral position, when release of former connections is insured and the selection may become effective in the recover travel of the clutch lever by bringing about the shifting desired. There is always disconnection of the main clutch 3 before any shifting occurs, yet in the quick travel forward and back, speed change may be effected from the clutch lever in a most smooth and quiet manner.

In addition to the compactness for one hand manipulation of the steering and selecting, there may be one leg control of the shifting and emergency braking. The added results which may be so quickly and simply attributed to standard elements of motor vehicle control bring to the motor vehicle to which the invention herein is adapted, advantages all drivers keenly appreciate.

What is claimed and it is desired to secure by Letters Patent is:

1. In a motor vehicle, speed changing driving mechanism, a rotary member connected thereto, a brake for the rotary member, a lever, and connecting means attached to the lever to control the mechanism and brake, said lever operable positively through the means to control the driving mechanism and apply the brake to the member.

2. A driving device, a driven member actuable thereby, control means for said device embodying a lever pivotally mounted to travel in a single plane and reciprocable to control the driving device, and a brake for the driven member actuable by said lever in its driving device control direction travel.

3. A driving member, a driven member, mechanism having a plurality of driving relations therebetween, control means for the mechanism having a neutral position toward which the means is movable from driving position of the mechanism, a brake for the driven member, and means for connecting the brake to the control means at the neutral position of said means for brake control by continued travel of the driving means beyond neutral position.

4. A driving member, a driven member, mechanism for establishing a plurality of driving relations therebetween, said mechanism embodying a pair of reciprocable members, actuating disk means for reciprocating said members by positively disconnecting said reciprocable members from driving relation, and a selector operable at any time for determining any actuating disk means connection to a reciprocable member.

5. A driving member, a driven member, mechanism for establishing a plurality of driving relations therebetween, said mechanism embodying reciprocable members, an actuator disk for one of said members effective to move said member in two directions positively to disconnecting position from different driving relations, a selector operable at any time for determining any connection of said actuator, and a pedal for moving the actuator.

6. A driving member, a driven member, mechanism for establishing a plurality of driving relations therebetween, said mechanism embodying a reciprocable member having an intermediate neutral position, an oscillating actuating disk for said member to move said member in two directions from said neutral position positively, a selector operable at any time for determining any actuating disk connection, and driving means for the disk.

7. A driving member, a driven member, mechanism for establishing a plurality of driving relations therebetween, said mechanism embodying a reciprocable member having an intermediate neutral position, an oscillating disk having engaging means for said member, and means precluding engagement of said disk with said member at other than neutral position of said member.

8. A driving member, a driven member, mechanism for establishing a plurality of driving relations therebetween, said mechanism embodying a reciprocable member, a selecting cam for determining two direction throws of the member, and actuating means for the member in the selected direction.

9. A driving member, a driven member, mechanism for establishing a plurality of driving relations therebetween, said mechanism embodying reciprocable members, and a selecting cam member for determining the reciprocable member to be thrown.

10. A driving member, a driven member, mechanism for establishing a plurality of driving relations therebetween, said mechanism embodying reciprocable members, a selecting cam member for determining direction throws of the members, and actuating means for the selected reciprocable member.

11. A driving member, a driven member, mechanism for establishing a plurality of driving relations therebetween, said mechanism including an actuating disk, a driving pedal for directly actuating the disk, and a selector operable at any time for determining any connection for the disk independently of the position of the pedal.

12. A driving member, a driven member, mechanism for establishing a plurality of driving relations therebetween, said mechanism including an actuating disk, an actuating member therefor, and yieldably resisting connecting means between the actuating member and the disk permitting the actuating member to travel before the disk is operated.

13. A driving member, a driven member, mechanism for establishing a plurality of driving relations between said members, a clutch for connecting the driving member to the mechanism, said mechanism including an actuating disk, a driving member for actuating the clutch and disk, and yieldably resisting connecting means between the driving member and disk permitting the clutch to be operated before the disk is operated.

14. A driving member, a driven member, mechanism for establishing a plurality of driving relations therebetween, said mechanism including members movable different distances to effect establishment of driving relations, a selector for the driving relations, and manually actuable means for moving the members different distances.

15. A driving member, a driven member, mechanism for establishing a plurality of driving relations therebetween, said mechanism including a reciprocable member, a rotatable actuator for said member, said actuator having teeth of different sizes, means engaged by said actuator teeth to be moved different distances by engaging different teeth, and means for oscillating the actuator.

16. A driving member, a driven member, mechanism for establishing a plurality of driving relations therebetween, said mechanism including an oscillating member movable toward and from neutral position, a shift member engageable with said oscillating member at neutral position, and means precluding disengagement of said members at other than neutral position.

17. A driving member, a driven member, mechanism for establishing a plurality of driving relations therebetween, said mechanism including an actuating member movable toward and from neutral position, a shift member engageable with said actuating member at neutral position, and means precluding disengagement of said members at other than neutral position.

18. A driving member, a driven member, mechanism for establishing a plurality of driving relations therebetween, said mechanism embodying a reciprocable member having an intermediate neutral position, an actuating member having engaging means for said reciprocable member, and guiding means preventing said actuating member and said reciprocable member from engagement with each other at other than neutral position of said reciprocable member.

19. A driving member, a driven member, mechanism for establishing a plurality of driving relations therebetween, said mechanism embodying a reciprocable member having an intermediate neutral position, an actuating member having engaging means for said reciprocable member, and means precluding disengagement of said members at other than neutral position.

20. A driving member, a driven member, mechanism for establishing a plurality of driving relations therebetween, said mechanism embodying independently shiftable members each having an intermediate neutral position, actuating means having engaging means for said shiftable members, a manually moved element directly connected to shift the members, and shift determining means controlling the engagement of the actuating means with the members, said shift determining means operable independently of the position of the manually moved element.

In witness whereof I affix my signature in the presence of two witnesses.

HUBERT A. MYERS.

Witnesses:
  GEO. KIRK,
  GLADYS JAMESON.